J. DALPAY.
HOE ATTACHMENT FOR RAKES.
APPLICATION FILED SEPT. 30, 1908.
923,629.
Patented June 1, 1909.
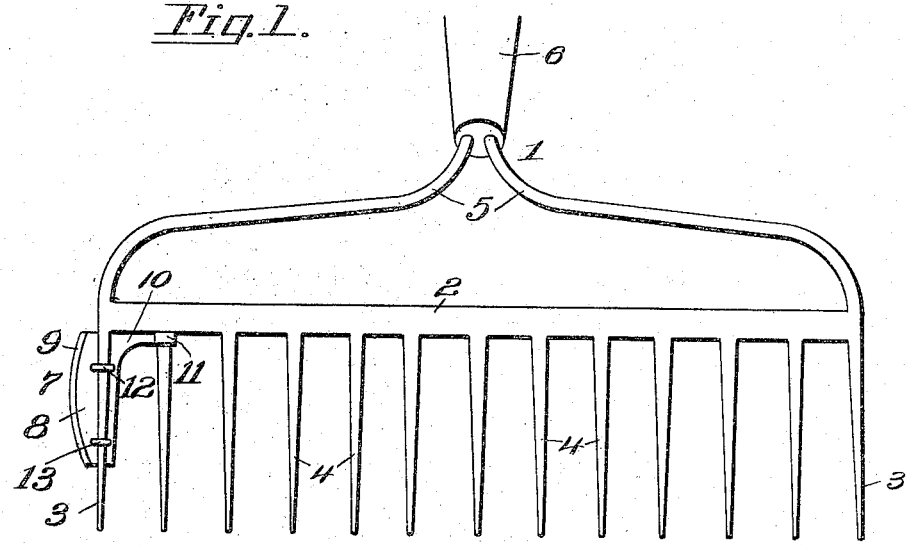
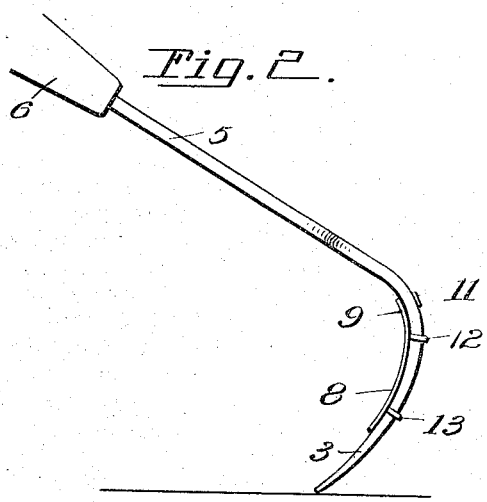
Witnesses
F. C. Gibson.
Inventor
Joseph Dalpay
By Victor J. Evans
Attorney

UNITED STATES PATENT OFFICE.

JOSEPH DALPAY, OF NEWPORT, WASHINGTON.

HOE ATTACHMENT FOR RAKES.

No. 923,629.　　　　　Specification of Letters Patent.　　　Patented June 1, 1909.

Application filed September 30, 1908. Serial No. 455,409.

To all whom it may concern:

Be it known that I, JOSEPH DALPAY, a citizen of the United States, residing at Newport, in the county of King and State of Washington, have invented new and useful Improvements in Hoe Attachments for Rakes, of which the following is a specification.

This invention relates to hoe attachments for rakes or the like, and has for an object to provide a device of this character that can be conveniently and quickly attached to a rake at one end thereof, and which will effectively serve as means adapted for operation to remove weeds or the like from the ground during the raking process.

A further object of this invention is to provide a device of the above described character that can be applied to all forms of rakes without changing or injuring the same.

Other objects and advantages will be apparent as the nature of the invention is better set forth, and it will be understood that changes within the scope of the claim may be resorted to without departing from the spirit of the invention.

In the drawing, forming a portion of this specification and in which like numerals of reference indicate similar parts in the several views,—Figure 1 is a rear view of a rake showing the application of the present invention thereto, Fig. 2 is an end view.

Referring now more particularly to the drawing, there is shown a rake 1 comprising a head 2 having end teeth 3 and intermediate series of teeth 4 properly spaced from each other in the ordinary manner. The head 2 is provided with the usual connecting arms 5 adapted to be engaged with a handle 6 of suitable form.

The hoe attachment as shown at 7, is preferably formed from sheet steel and is curved to conform to the curvature of the teeth carried by the head 2. Upon reference to the drawing it will be seen that the hoe attachment is located at one end of the rake and is preferably provided with a blade portion 8 having a beveled cutting edge 9, and at the upper end the said blade portion has integrally formed therewith a lateral extension 10 having its terminal end looped around one of the intermediate teeth 4, as shown at 11 in Fig. 1 of the drawing. The blade portion 8 has projecting therefrom eye members 12 and 13 which are engaged with one of the end teeth 3, as shown. It will be seen that the said hoe attachment is constructed in a manner so that it can be conveniently and effectively engaged with the teeth of the rake in a manner to expose the cutting edge 9.

By the provision of the hoe attachment at the end of the rake it will be seen that a double operation may be performed while an operator is in the field or raking a lawn or the like and the inconvenience of carrying a hoe will be eliminated.

The device as shown, may be constructed from sheet steel or like metal and applied to well known forms of rakes without changing or injuring the same.

Having thus described the invention what I claim is:—

A device of the class described comprising a blade having a cutting edge, tooth-engaging means carried by the blade, and a lateral extension formed integral with the blade and adapted to be secured to a raketooth.

In testimony whereof I affix my signature in presence of two witnesses.

JOSEPH DALPAY.

Witnesses:
　W. B. PUTNAM,
　G. F. MCLAUGHLIN.